Patented Jan. 19, 1932

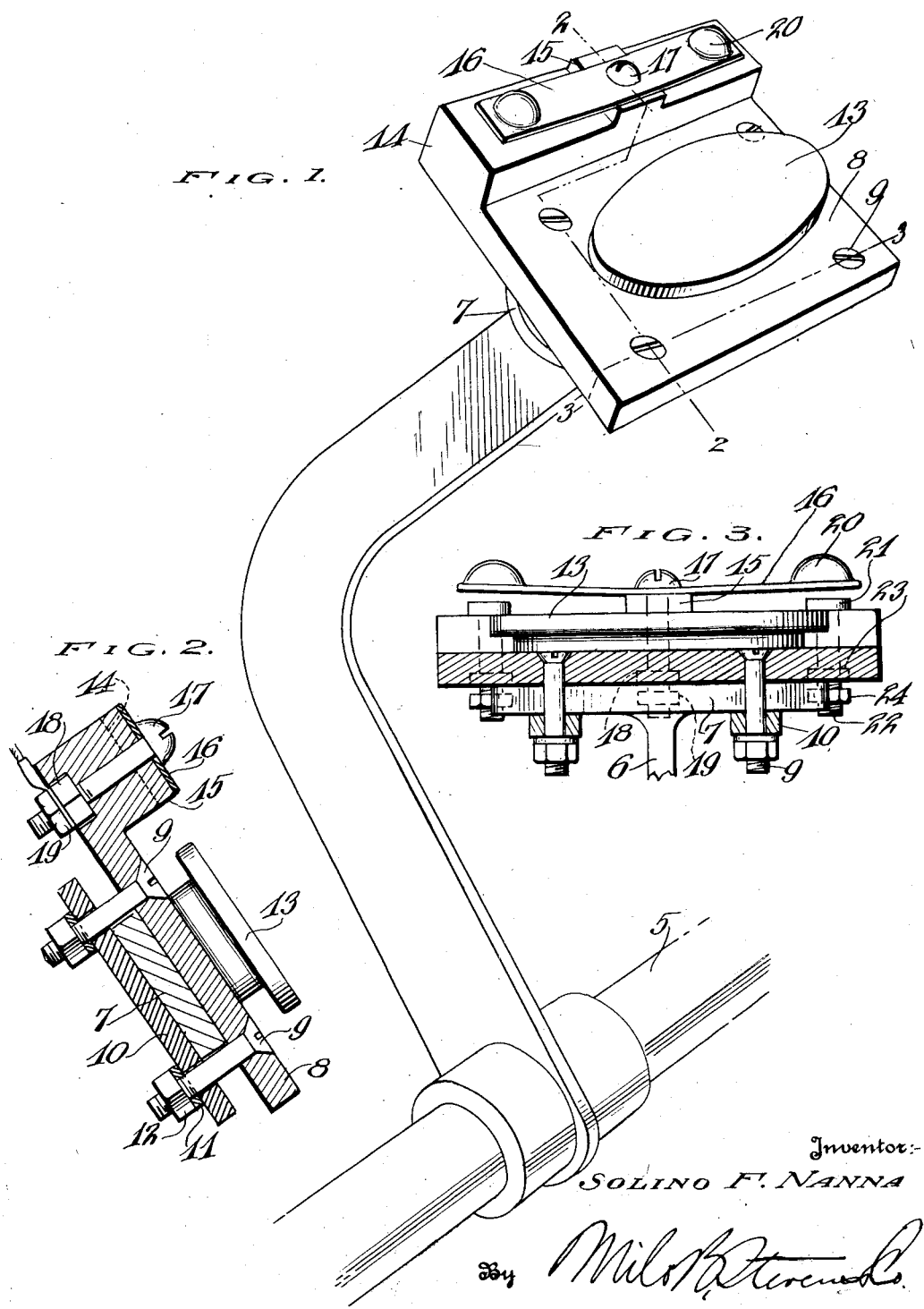

1,842,044

UNITED STATES PATENT OFFICE

SOLINO F. NANNA, OF MILWAUKEE, WISCONSIN

AUTO SIGNAL CONTROL

Application filed December 12, 1928. Serial No. 325,593.

My invention relates to automobile signals for the indication of the direction about to be taken by an automobile equipped with the signal, and more particularly to the controlling element for such signals, my main object being to provide a control which is actuated with a minimum amount of effort or attention.

A further object of the invention is to design the novel control with an operating mechanism of a dependable character and extreme simplicity.

A final, but nevertheless important object of the invention is to construct the novel control of inexpensive materials in order that it may be marketed at a low figure.

With the above objects in view and any others that suggest themselves from the specification and claims to follow, a better understanding of the invention may be gained by reference to the accompanying drawings, in which—

Figure 1 is a perspective view of the novel control, showing the manner of its installation; and Figs. 2 and 3 are, respectively, sections on the lines 2—2 and 3—3 of Figure 1.

My invention is applicable to signals of the type which indicate a right turn or a left turn about to be taken, either by a moving legend or by lights. The specific nature of the signal is immaterial, and no further mention need be made of it except to state that it is controlled through an electrical circuit.
My improvement resides in the control and is limited to that class of controls which applies to the driver's operating pedals, taking advantage of the clutch pedal of the automobile in particular, although the brake pedal could be used as well for the application of my control. My reason for choosing the clutch pedal is because of the less frequent use of the pedal by the driver, making it more convenient to use the clutch pedal foot for the auxiliary purpose of the signal control.

The prior art contains inventions showing the application of a control to a foot pedal of an automobile in the nature of an attachment, which enables the foot to be used both for the control of the pedal and the actuation of the signal control. My invention is along the same lines, except that it departs in certain respects from the features of the prior art whereby to result in a control which fulfills the objects contemplated above.

Referring specifically to the drawings, 5 denotes the rock shaft, 6 the arm and 7 the foot plate of a typical clutch or brake pedal of an automobile.

In the design of the novel control for application to a pedal of this kind, I first provide a slab 8 of hard rubber, treated wood or other insulating material, directing screws 9 from the observe side of the slab through the same to also pass through parallel bars 10 of metal and receive lock washers 11 and nuts 12 on the remote side of the bars. The spacing of the bars 10 is such as to receive between them the ends of the pedal foot plate 7 when the slab 8 is laid upon the same, the nuts then being used to clamp the end portions of the said foot plate between the bars and the slab. Thus, the slab becomes firmly secured or clamped upon the foot plate 7 of the pedal.

The slab is enlarged upon its obverse side with a mounting 13 having the form of the foot plate 7 and being intended to serve the same purpose. In case the foot plate 7 was jacketed with a rubber cap or mounting for the pedal frictional engagement of the foot with the pedal, such cap or mounting may be easily removed when the attachment is applied, and reaffixed upon the mounting 13 to serve its original purpose.

The forepart of the slab 8 is raised with a cross bar 14 which in turn is medially raised with a rib 15. A spring metal flat strip 16 is laid across the rib 15 to extend in parallel relation to the cross bar 14, the medial portion of the strip being soldered or otherwise formed integral with a screw 17 which passes down through the slab to receive a sunken nut 18 from the underside of the slab, and an additional nut 19. The ends of the strip 16 are built up with protuberant formations or buttons 20 secured to or formed integrally with the strip. Below the end portions of the strip, the cross bar 14 of the flap receives the caps or heads 21 of two screws 22, which pass through the slab to receive nuts 23 sunken in the underside of the same, and additional nuts 24. As noted particularly in Figure 3, the strip has a slight upward inclination in the directions of its ends, the latter being separated by a short space from the screw heads 21. Thus, when pressure is brought to bear upon either of the buttons 20 whereby to cause the strip to make contact with the corresponding screw cap 21, the release of the particular button will be followed by the return of the affected portion of the strip to normal or poised position by virtue of the tension of the strip, the contact of the affected porton of the strip with the pedal screw head thus being broken.

In the application of the novel control, I attach the feed wire of the circuit to the center screw 17, firmly securing the wire between the nuts 19 and 18 upon the same. The "right" and "left" signal wire leads are secured in the same manner to the right and left-hand screws 22 by means of the proper nuts 23 and 24. It will now be evident that a contact of the strip by the previously described method with either of the screw caps 21 will induce the operation of the corresponding signal legend or light.

In actuating the novel control, it is but necessary to advance the foot slightly from its position upon the mounting 13 whereby to have the toe located opposite either the right-hand or left-hand button 20, as may be necessary. Then, while the ball of the foot is still rested upon the mounting 13, the toe is slightly depressed to bear down upon the button to the extent of securing the necessary electrical contact for the signal. In some cases, the positions of the foot upon the pedal need not be shifted at all, it merely being necessary to roll or rock the foot forwardly with some lateral pressure in the one or other direction to secure the desired result. Thus, one can become accustomed to the auxiliary control in a short time to the extent of exercising the same without any appreciable effort or attention.

The simplicity of the novel control is easily evident, the same consisting essentially of the contact strip, the contacts and the conveniently located foot support. The device is of a compact and rigid character, generally speaking, and has no delicate or intricate parts which require undue attention or are apt to get out of order. Also, no special electrical or insulating elements are present which may become inoperative because of loss of adjustment, corrosion or inherent lack of stability. As noted, the parts I employ are of a rugged nature, and are dimensioned sufficiently large for secure fastening, retention of shape, and strains incident to use. In conclusion, it may be said that the article is of extreme simplicity and since it involves parts of plain design and inexpensive material, it may be manufactured and sold at a low figure.

While I have illustrated and described the invention in the preferred form, it will be evident that the same is capable of minor changes and refinements and it is my intention to include such changes and refinements as coming within the spirit and scope of the appended claims.

I claim:

1. The combination with a pedal carrying medial and lateral contact posts located above the portion of said pedal contacted by the foot of the driver normally; of a switch comprising a resilient strip medially connected to said medial post and formed with terminal abutments depressible to flex the ends of the strip into contact with said lateral posts.

2. The combination with a pedal carrying medial and lateral contact posts located above the portion of said pedal contacted by the foot of the driver normally; of a switch comprising a resilient strip medially connected to said medial post, and protuberant buttons mounted at the ends of the strip, said buttons being depressible to flex the ends of the strip into contact wtih said lateral posts.

3. A switch attachment for a control pedal, comprising an insulation slab clamped upon the pedal, a raised portion at one end of the slab and transversely directed, a projection medially of such portion, switch contacts in the projection and terminally of the raised portion, and a switch strip connected to the medial contact and adapted to meet the terminal contacts.

4. A switch attachment for a control pedal comprising an insulation slab clamped upon the pedal, a switch at the forward end of the slab and a raised foot plate on the rear portion thereof.

In testimony whereof I affix my signature.

SOLINO F. NANNA.